United States Patent
Strauss et al.

(10) Patent No.: US 11,913,805 B2
(45) Date of Patent: Feb. 27, 2024

(54) METHOD AND DEVICE FOR PROCESSING SENSOR DATA

(71) Applicant: Robert Bosch GmbH, Stuttgart (DE)

(72) Inventors: Tobias Strauss, Obersulm (DE); Ali Alawieh, Untergruppenbach (DE); Philipp Tscholl, Abstatt (DE); Wei Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 185 days.

(21) Appl. No.: 17/610,247

(22) PCT Filed: Apr. 29, 2020

(86) PCT No.: PCT/EP2020/061877
§ 371 (c)(1),
(2) Date: Nov. 10, 2021

(87) PCT Pub. No.: WO2020/233955
PCT Pub. Date: Nov. 26, 2020

(65) Prior Publication Data
US 2022/0236076 A1    Jul. 28, 2022

(30) Foreign Application Priority Data
May 17, 2019    (DE) ..................... 10 2019 207 212.7

(51) Int. Cl.
*G01C 21/32*    (2006.01)
*H04W 4/40*    (2018.01)
(Continued)

(52) U.S. Cl.
CPC .......... *G01C 21/3848* (2020.08); *H04W 4/38* (2018.02); *H04W 4/40* (2018.02)

(58) Field of Classification Search
CPC .......... G01C 7/04; G01C 21/23; G01C 21/36; G01C 21/32; G09B 29/00; B60W 40/02; H04L 29/08
See application file for complete search history.

(56) References Cited

U.S. PATENT DOCUMENTS

| 2013/0163816 A1 | 6/2013 | Hunt, Jr. |
| 2015/0244826 A1 | 8/2015 | Stenneth |

(Continued)

FOREIGN PATENT DOCUMENTS

| DE | 102016205436 A1 | 6/2017 |
| JP | H11249552 A | 9/1999 |

(Continued)

OTHER PUBLICATIONS

International Search Report for PCT/EP2020/061877, dated Jul. 31, 2020.

(Continued)

*Primary Examiner* — Tan Q Nguyen
(74) *Attorney, Agent, or Firm* — NORTON ROSE FULBRIGHT US LLP; Gerard A. Messina

(57) ABSTRACT

A method for processing sensor data. The method including: providing surroundings data of a vehicle; assigning the surroundings data to corresponding locating data; and transferring the locally assigned surroundings data to a processing device, the transfer of the surroundings data between a sensor unit and a control unit and/or the transfer of the locally assigned surroundings data between the control unit and the processing device being carried out according to a defined data limiting criterion.

10 Claims, 1 Drawing Sheet

(51) Int. Cl.
  *G01C 21/00* (2006.01)
  *H04W 4/38* (2018.01)

(56) References Cited

U.S. PATENT DOCUMENTS

| | | | | |
|---|---|---|---|---|
| 2017/0076162 A1* | 3/2017 | Nordbruch | ............ | G06V 20/58 |
| 2017/0371060 A1* | 12/2017 | Nogueira-Nine | ....... | G01S 15/04 |
| 2018/0154901 A1* | 6/2018 | Hasberg | ................ | G01S 5/0247 |
| 2018/0188044 A1* | 7/2018 | Wheeler | ............. | G05D 1/0274 |
| 2019/0206241 A1* | 7/2019 | Irion | ........................ | G08G 1/14 |
| 2020/0192353 A1* | 6/2020 | Mielenz | ................. | G06V 20/56 |

FOREIGN PATENT DOCUMENTS

| | | |
|---|---|---|
| JP | 2003203243 A | 7/2003 |
| JP | 2016156973 A | 9/2016 |
| JP | 2019168263 A | 10/2019 |
| WO | 2018126215 A1 | 7/2018 |
| WO | 2019053524 A1 | 3/2019 |
| WO | 2020104355 A1 | 5/2020 |

OTHER PUBLICATIONS

Srivastava et al., "Approximate Continuous Belief Distributions for Precise Autonomous Inspection," 2016 IEEE International Symposium on Safety, Security, and Rescue Robotics (SSRR), Lausanne, 2016, pp. 1-7. <https://www.ri.cmu.edu/pub_files/2016/10/SSRR16_0059_Fl.pdf> Nov. 9, 2021.

Ulrich et al., "Appearance-Based Place Recognition for Topolgicalo Localization," Proceedings 2000 ICRA, Millennium Conference, IEEE International Conference on Robotics and Automation, Symposia Proceedings, San Francisco, CA, 2000, pp. 1-7. <http://www.cs.cmu.edu/~iwan/papers/localization.pdf> Nov. 9, 2021.

Massow et al., "Deriving HD Maps for Highly Automated Driving From Vehicular Probe Data," 2016 IEEE 19th International Conference on Intelligent Transportation Systems (ITSC), IEEE, 2016, pp. 1745-1752.

* cited by examiner

METHOD AND DEVICE FOR PROCESSING SENSOR DATA

FIELD

The present invention relates to a method for processing sensor data. The present invention further relates to a device for processing sensor data. The present invention further relates to a control unit. The present invention further relates to a computer program. The present invention further relates to a machine-readable memory medium.

BACKGROUND INFORMATION

Very high expectations and requirements are generally imposed on technologies which make automated driving possible. One of these requirements is a detailed, accurate, up-to-date and complete digital map of the surroundings, which is sufficiently precise to ensure a robust, accurate and reliable localization, planning and navigation of AD (automatic driving) or ADAS vehicles (advanced driver assistance system) in surroundings of this type.

Data of "surroundings maps" of this type are conventionally detected by dedicated mapping vehicles, which are equipped with highly accurate and cost-intensive surroundings sensors. These vehicles are able to detect nearly all features of the surroundings. However, to provide the aforementioned requirements for a complete, accurate and up-to-date surroundings map of the entire world, an approach of this type is very cost-intensive and impractical to carry out.

Numerous cost-effective sensors (e.g., GPS, radar, camera, etc.) are installed in vehicles today for use in driver assistance systems.

In practice, however, the bandwidth of each vehicle is extremely limited (e.g., to approximately 10 KB/km) for the map generating device, which is usually situated in the cloud, which means that only a small amount of the surroundings data may be transferred, but certainly not the sensor raw data.

Data from surroundings sensors are already used today to perform specific driving tasks of a vehicle. For example, surroundings sensor data are used to control autonomous emergency braking (AEB) assistants or adaptive cruise control (ACC) systems. The surroundings sensor data are typically ascertained by radar sensors and/or cameras for implementing functions such as AEB or ACC. Common to all of these functions is that their field of action is extremely limited.

German Patent Application No. DE 10 2016 205 436 A1 describes a method and a system for creating a digital map. It teaches that only sections of the vehicle surroundings are taken into account to create the digital map, not the entire vehicle surroundings but only a part thereof being detected by the vehicle sensors during a communication between the vehicle and the cloud.

S. Shobhit and N. Michael, "Approximate continuous belief distributions for precise autonomous inspection," in 2016 IEEE International Symposium on Safety, Security, and Rescue Robotics (SSRR), Lausanne, 2016, describes a hierarchical surroundings model, in which each hierarchy degree is a representation of the world having a certain level of abstraction.

I. Ulrich and I. Nourbakhsh, "Appearance-based place recognition for topological localization," in Proceedings 2000 ICRA, Millennium Conference, IEEE International Conference on Robotics and Automation, Symposia Proceedings Cat. No. 00CH37065, San Francisco, 2000, describes a method for a topological precision or a localization having a limited precision.

SUMMARY

An object of the present invention is to provide an improved method for processing sensor data.

According to a first aspect of the present invention, the object is achieved by a method for transferring sensor data. In accordance with an example embodiment of the present invention, the method includes the following steps:

providing surroundings data of a vehicle;

assigning the surroundings data to corresponding locating data; and transferring the locally assigned surroundings data to a processing device, the transfer of the surroundings data between a sensor unit and a control unit and/or the transfer of the locally assigned surroundings data between the control unit and the processing device being carried out according to a defined data limiting criterion.

A transfer of the surroundings data may be advantageously carried out even in the case of a reduced bandwidth of communication channels between the sending unit and the control unit or between the control unit and the processing device. In this way, raw data of the surroundings data may be advantageously reduced by a factor in the magnitude of approximately 100. The size of a mapping fleet used exclusively for the purpose of creating a digital map may be advantageously significantly reduced in this way, because the surroundings data may be advantageously detected and transferred using normal production vehicles.

According to a second aspect of the present invention, the object may be achieved by a device for transferring sensor data. In accordance with an example embodiment of the present invention, the device includes:

a sensor unit for providing surroundings data of a vehicle;

a locating unit;

a control unit for assigning the surroundings data to corresponding locating data;

a first transferring unit for transferring the surroundings data from the sensor unit to the control unit and a second transferring unit for transferring the locally assigned surroundings data to a processing device situated outside the device, the transfer of the surroundings data between the sensor unit and the control unit and/or the transfer of the locally assigned surroundings data between the control unit and the processing device being carried out according to a defined data limiting criterion.

According to a third aspect of the present invention, the object is achieved by a control unit, which is configured to carry out the described method.

According to a fourth aspect of the present invention, the object is achieved by a computer program, including commands, which, upon the execution of the computer program by a computer, prompt the latter to carry out the described method.

According to a fifth aspect, the object is achieved by a machine-readable memory medium, on which the computer program is stored.

Advantageous refinements of the method are disclosed herein.

One advantageous refinement of the method in accordance with the present invention provides that the surroundings data are selected with the aid of the data limiting criterion. A first data limiting strategy is implemented thereby.

A further advantageous refinement of the method in accordance with the present invention provides that randomly selected surroundings data are transferred. A further data limiting strategy is implemented in this way.

A further advantageous refinement of the method in accordance with the present invention provides that a prioritizing of the detection activity of the sensor unit is carried out in defined directions when ascertaining the surroundings data. A further data limiting strategy is implemented in this way.

Further advantageous refinements of the method in accordance with the present invention are characterized in that a locally and/or temporally defined dense detection of measuring points is carried out when providing the surroundings data. In this way, so-called point cloud measurements are carried out, with the aid of which a further data limiting strategy is implemented. In this way, sections of the surroundings having a very high resolution or having a somewhat coarser or lower resolution may be detected, which has an effect in terms of a data quantity of surroundings data.

In a further advantageous refinement of the method of the present invention, a frequency of the provision of the detection of the surroundings data is formed as a function of the speed of the vehicle. A defined bandwidth per defined road section may be detected thereby, by means of which a further data limiting strategy may be implemented.

A further advantageous refinement of the method of the present invention provides that the surroundings data are used for creating a digital map. An advantageous application for the described method is implemented in this way.

The present invention, including further features and advantages, is described in detail below on the basis of multiple figures. Technical features and advantages of the described device of the present invention similarly result from technical features and advantageous of the described method of the present invention.

DETAILED DESCRIPTION OF EXAMPLE EMBODIMENTS

A main feature of the present invention is, in particular, to carry out a transfer of sensor data at a limited bandwidth in the vehicle. As an example of an application, the provision of data for creating an optimized digital map is described.

Very precise and robust digital maps, which are as complete and highly available as possible, may advantageously be created with the aid of the surroundings data provided according to the present invention. The general principle is advantageously very simple and permits a large number of implementations and applications, which are described below only as examples.

Each application requires one or multiple data transfer strategies, which are specifically suitable therefor. Assuming the specific problem, the information available for decision making is the degree of freedom relating to available surroundings data to be transferred as well as weightings assigned to each optimization goal relating to surroundings data (accuracy, completeness, etc.). Different strategies may be derived by solving optimization problems, which result from each individual application.

Figure 1:
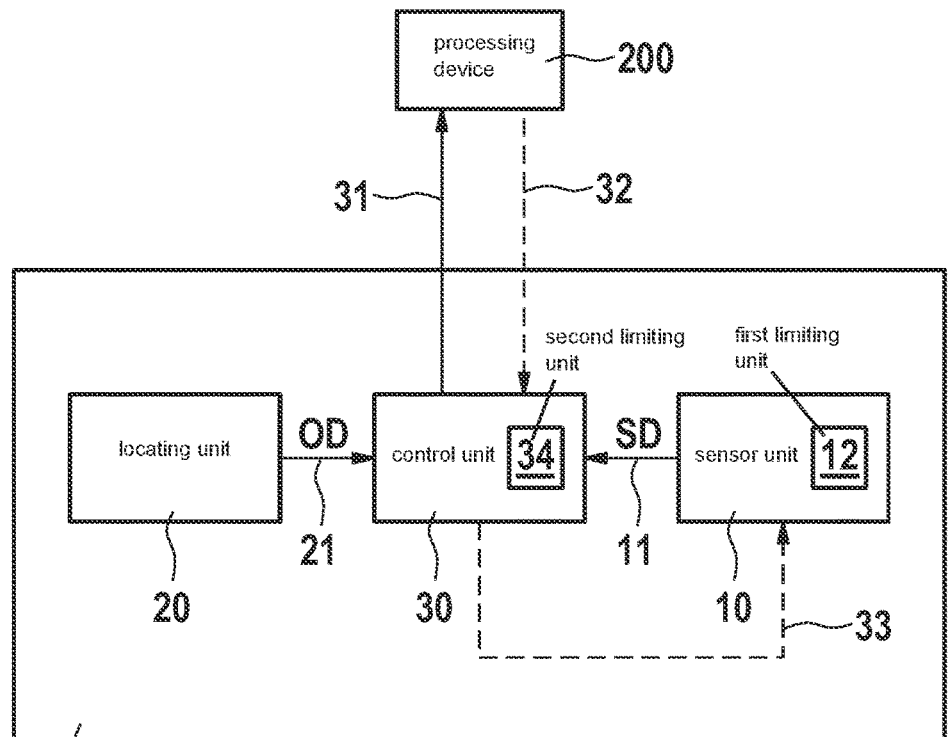
FIG. 1 shows a representation of a device for processing sensor data, in accordance with an example embodiment of the present invention.

Depending on the connectivity status of each vehicle, multiple scenarios may be observed, which are explained in greater detail on the basis of FIG. 1.

FIG. 1 shows one specific embodiment of a described device 100 for processing sensor data. A sensor unit 10 (e.g., radar sensor, LIDAR sensor, camera, etc.) of a vehicle (not illustrated) is apparent, which is functionally connected to a central control unit 30 (e.g., electronic control unit, ECU) via a first line 11 (e.g., CAN bus), which, in turn, is connected, with the aid of a second line 31, to a processing device 200, which is situated, for example, in the cloud. Second line 31 is not to be understood here in the physical sense but rather as a data link channel (e.g., a radio link). Each of the two lines 11, 31 has a bandwidth limitation, which may transfer only a limited section of x percent of sensor data to control unit 30 and only y percent of sensor data to processing device 200, x and y in general usually being much less than 100 percent.

Sensor data are understood in this connection to be either sensor raw data or (what is normally the case) processed measured data (e.g., due to filtering, feature extraction, modeling, etc.).

After control unit 30 has additional access to other sources of information, e.g., to a locating unit 20, stored maps, etc., with the aid of a third line 21, and after, as mentioned, an optimal transfer strategy has been positively influenced by the scope of the available information, two in principle different applications may be differentiated for this situation:

Application 1: Sensor unit 10 is delivered with already correspondingly preconfigured software and may not be reconfigured.

Application 2: Sensor unit 10 may be controlled or configured by control unit 30, it being possible to influence in this way which sensor data sensor unit 10 transfers to control unit 30.

In the first application, which is the normal case for ordinary vehicles, the optimal strategy will be to permanently set a data transfer strategy relating to sensor data, while in the second application, a data transfer strategy relating to sensor data is adapted to a specifically existing situation. An optimized digital map may be implemented with the aid of the two applications, utilizing a systemic bandwidth limitation.

In this way, for example, a fixed or a randomized transfer of the sensor data via lines 11, 31 may take place with the aid of a data limiting criterion.

It may also be provided that control unit 30 may communicate with sensor unit 10 via a feedback line 33, control unit 30 being able to tell sensor unit 10, via feedback line 33, which sensor data it would like to have. For example, sensor data in the form of surroundings data SD, which were detected from a defined vehicle side, may be transferred in this way within a defined time segment.

It may furthermore be decided by processing device 200 in the form of a question/answer principle whether complete surroundings data SD are to be transferred to processing device 200. For example, surroundings data SD of a defined area (e.g., a geo-rectangular area) may be requested, which may be specified, for example, in the header of surroundings data SD' locally assigned in this manner. For this purpose, a feedback line 32 may be provided from processing device 200 to control unit 30.

It is apparent that, for the purpose of implementing the data limiting criterion, sensor unit 10 includes a first limiting unit 12, with the aid of which it is decided which surroundings data SD are probably the most relevant, which are then transferred to control unit 30. In this way, a prioritizing of important surroundings data SD already takes place on sensor unit 10.

Optionally or additionally, a second limiting unit 34 may be formed on control unit 30, which implements a data limiting criterion on control unit 30.

For example, using locating unit 20 (application 2), the vehicle may establish whether the road on which it is traveling is the one on which it has previously traveled. It is assumed that, during the first trip, it has sent a portion of surroundings data SD which are specific to a portion of the surroundings. By providing this information, an optimal behavior (for example, for optimal coverage of the digital map) may be that, during the second trip, another portion of surroundings data SD is now transferred, which was not transferred during the first trip. In application 1, an adaptation of this type in the direction of a better coverage may not be implemented.

Improved strategies relating to a limited data transfer may result from the fact that the vehicle may communicate with other vehicles in the surroundings. The strategies mentioned may, for example, adapt the behavior of the data transfer to minimize the disadvantage of mutual coverage, to improve an accuracy in certain sections of the map, to improve the coverage of the map, etc., all mentioned actions being carried out under the proviso of limited bandwidth.

What applies to the control or reconfiguration possibilities between control unit 20 and sensor unit 10 may also be applied to the connection between processing device 200 and control unit 30. For example, it makes a difference whether processing device 200 has the ability to request surroundings data SD from sensor unit 20 via feedback line 32 in the form of a specific type of information or to focus on some sections of the surroundings, etc., based on the present status of the digital map stored on processing device 200.

A further aspect relates to a dimensionality of the space from which surroundings data SD originate. For example, a fleet of vehicles may be equipped with radar sensors, each radar sensor carrying out so-called point cloud measurements of the surroundings during the travel of the vehicle. Each point in the point cloud measurement contains information, which extends a space in different dimensions (e.g., x direction, y direction, z direction, RCS, etc.) and contains variance/covariance values for some of these dimensions. In addition, at least one of the following parameters: recording time, vehicle type, sensor installation position, sensor software version, etc., may form the basis for other dimensions of the data space.

The strategy optimizing the accuracy and/or the coverage and/or the newness of the digital map should take into account the mentioned space dimensionality. This may be advantageously reflected in reduced costs of transferred surroundings data SD.

For example, a cost function may be given a higher weighting, which is related to a spatial accuracy, compared to a cost function which is related to the RCS accuracy, etc., which results in different data transfer strategies. The optimal data transfer strategy may be focused on some directions of the space, for example for each portion of the vehicle fleet.

Other weight functions may be defined for each dimension of the space by a degree of desired resolution per dimension and modified accordingly. For example, a high weighting may be placed on a spatial accuracy of surroundings data SD until the digital map has reached a defined degree of accuracy (e.g., in the magnitude of approximately 10 cm), after which the weighting of the spatial accuracy may be reduced, and the strategy of the limited sensor data may be directed to other dimensions.

A further example is the recording or detection time of surroundings data SD, different resolutions of sensor data recorded during the day or at night being able to be the focus of interest, the exact time of day tending to be of secondary importance. This may also decisively reduce a scope of transferred surroundings data SD.

As a result, a data transfer strategy may be advantageously defined with the aid of the described method, which makes it possible to form a conventional model from the related art, starting from high to low levels. In this way, the accuracy and up-to-dateness of the map data, and thus also the localization, may be improved as a function of the number of vehicles on the road in a defined region.

Although the method was explained in the present case in connection with the creation of a digital map, the method is not limited thereto. The present invention may be advantageously used not only to form an optimized digital map but also to reach an optimal objective. This may be, for example, an optimized localization, for example in the form of accuracy, availability, robustness, security, etc., or involve a general, optimized functionality (e.g., localization, planning, perception or other functions), which the vehicle carries out using the map to be created.

Figure 2:
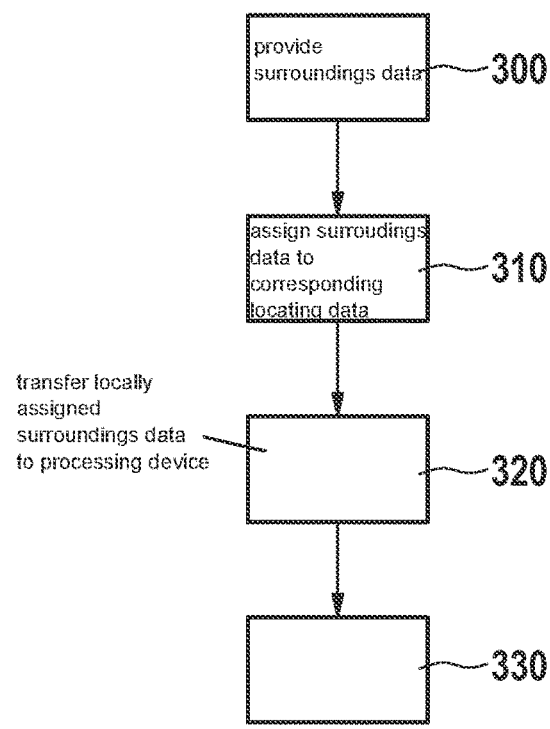
FIG. 2 shows a schematic representation of a flowchart of a method for processing sensor data, in accordance with an example embodiment of the present invention.

FIG. 2 shows a principle sequence of a described method for processing sensor data.

In a step 300, a provision of surroundings data SD of a vehicle is carried out with the aid of a sensor unit 10.

In a step 310, an assignment of surroundings data SD to corresponding locating data OD is carried out.

In a step 320, a transfer of locally assigned surroundings data SD' to a processing device 200 is carried out, the transfer of surroundings data SD between sensor unit 10 and a control unit 30 and/or the transfer of locally assigned surroundings data SD' between control unit 30 and processing device 200 is/are carried out according to a defined data limiting criterion.

The method according to the present invention may advantageously be implemented as software, which runs, for example, on electronic control unit 30 in the form of a control unit in the vehicle or on a server unit in a cloud-based manner. An easy adaptability of the method is supported in this way.

Those skilled in the art will modify the features of the present invention in a suitable way and/or combine them with each other without departing from the core of the present invention, in view of the disclosure herein.

What is claimed is:

1. A method for processing sensor data, comprising the following steps:
providing surroundings data of a vehicle from a sensor unit to a control unit, wherein in accordance with a first bandwidth limitation of communications between the sensor unit and the control unit, the sensor unit determines to send to the control unit x percent of sensor data generated by the sensor unit;
assigning the surroundings data to corresponding locating data; and
transferring, from the control unit, locally assigned surroundings data to a processing device, wherein in accordance with a second bandwidth limitation of communications between the control unit and the processing device, the control unit determines to send to the processing unit y percent of the sensor data;

wherein a transfer of the surroundings data between the sensor unit and the control unit and/or a transfer of the locally assigned surroundings data between the control unit and the processing device, is being carried out according to a defined data limiting criterion.

2. The method as recited in claim 1, wherein the surroundings data are selected for transfer using the data limiting criterion.

3. The method as recited in claim 2, wherein randomly selected surroundings data are transferred.

4. The method as recited in claim 1, wherein a prioritizing of detection activity of the sensor unit is carried out in defined directions when ascertaining the surroundings data.

5. The method as recited in claim 1, wherein a locally and/or temporally defined dense detection of measuring points is carried out when providing the surroundings data.

6. The method as recited in claim 1, wherein a frequency of a provision of a detection of the surroundings data is formed as a function of a speed of the vehicle.

7. The method as recited in claim 1, wherein the surroundings data are used to create a digital map.

8. A device for transferring sensor data, comprising:
a sensor unit configured to provide surroundings data of a vehicle;
a locating unit;
a control unit configured to assign the surroundings data to corresponding locating data;
a first transferring unit configured to transfer the surroundings data from the sensor unit to the control unit; and
a second transferring unit configured to transfer locally assigned surroundings data to a processing device situated outside the device;
wherein the transfer of the surroundings data between the sensor unit and the control unit and/or the transfer of the locally assigned surroundings data between the control unit and the processing device is carried out according to a defined data limiting criterion, wherein in accordance with a first bandwidth limitation of communications between the sensor unit and the control unit, the sensor unit determines to send to the control unit x percent of sensor data generated by the sensor unit, and wherein in accordance with a second bandwidth limitation of communications between the control unit and the processing device, the control unit determines to send to the processing unit y percent of the sensor data.

9. A control unit for processing sensor data, the control unit configured to:
provide surroundings data of a vehicle from a sensor unit to a control unit, wherein in accordance with a first bandwidth limitation of communications between the sensor unit and the control unit, the sensor unit determines to send to the control unit x percent of sensor data generated by the sensor unit;
assign the surroundings data to corresponding locating data; and
transfer, from the control unit, locally assigned surroundings data to a processing device, wherein in accordance with a second bandwidth limitation of communications between the control unit and the processing device, the control unit determines to send to the processing unity percent of the sensor data;
wherein a transfer of the surroundings data between the sensor unit and the control unit and/or a transfer of the locally assigned surroundings data between the control unit and the processing device, is being carried out according to a defined data limiting criterion.

10. A non-transitory machine-readable memory medium on which is stored a computer program for processing sensor data, the computer program, when executed by a computer, causing the computer to perform the following steps:
providing surroundings data of a vehicle from a sensor unit to a control unit, wherein in accordance with a first bandwidth limitation of communications between the sensor unit and the control unit, the sensor unit determines to send to the control unit x percent of sensor data generated by the sensor unit;
assigning the surroundings data to corresponding locating data; and
transferring, from the control unit, locally assigned surroundings data to a processing device, wherein in accordance with a second bandwidth limitation of communications between the control unit and the processing device, the control unit determines to send to the processing unit y percent of the sensor data;
wherein a transfer of the surroundings data between the sensor unit and the control unit and/or a transfer of the locally assigned surroundings data between the control unit and the processing device, is being carried out according to a defined data limiting criterion.

* * * * *